US005391959A

United States Patent [19]
Labib et al.

[11] Patent Number: 5,391,959
[45] Date of Patent: * Feb. 21, 1995

[54] FLUORESCENT LAMPS AND IMPROVED YYTRIUM-CONTAINING PHOSPHORS USEFUL THEREIN

[75] Inventors: Mohamed E. Labib, Princeton, N.J.; Henry Wielicki, deceased, late of Wyndmoor, Pa., by Edward Wielicki, Joanna Wielicki, executors; Pamela K. Whitman, Mayfield Village, Ohio

[73] Assignee: General Electric Company, Schenectady, N.Y.

[*] Notice: The portion of the term of this patent subsequent to Dec. 7, 2010 has been disclaimed.

[21] Appl. No.: 54,176

[22] Filed: Apr. 30, 1993

Related U.S. Application Data

[60] Division of Ser. No. 908,598, Jun. 30, 1992, Pat. No. 5,268,614, which is a continuation of Ser. No. 656,655, Feb. 19, 1991, abandoned.

[51] Int. Cl.$^6$ ............... H01J 1/63; C09K 11/61; C09K 11/70
[52] U.S. Cl. ............... 313/486; 313/487; 313/489; 252/301.4 P.301.4 S; 252/301.4 H; 428/403; 428/691; 428/704
[58] Field of Search ............... 313/466, 486, 487, 565, 313/572, 577, 489; 252/301.6 P, 301.4 P, 301.4 H, 301.4 S, 301.6 S; 428/403, 691, 704, 917, 688; 427/66, 67, 68

[56] References Cited

U.S. PATENT DOCUMENTS

| | | | |
|---|---|---|---|
| 3,441,512 | 4/1969 | Durkee | 252/301.4 |
| 3,607,371 | 9/1971 | Haynes et al. | 252/301.4 R X |
| 3,619,265 | 11/1971 | Hammond et al. | 252/301.4 R X |
| 3,668,142 | 6/1972 | Luckey | 252/301.4 R X |
| 3,740,250 | 6/1973 | Hammond et al. | 428/691 |
| 3,789,014 | 1/1974 | Graff et al. | 252/301.4 P |
| 3,875,449 | 4/1975 | Byler et al. | 313/466 |
| 4,048,533 | 9/1977 | Hinson et al. | 313/489 X |
| 4,103,069 | 7/1978 | Schulze et al. | 313/467 X |
| 4,175,160 | 11/1979 | Vanderpool | 252/301.36 X |
| 4,199,617 | 4/1980 | Vanderpool | 428/403 X |
| 4,243,909 | 1/1981 | Brecher et al. | 313/487 |
| 4,340,512 | 7/1982 | Schreurs | 427/67 X |
| 4,398,119 | 8/1983 | Dodds et al. | 313/466 |
| 4,459,507 | 7/1984 | Flaherty | 313/489 |
| 4,607,191 | 8/1986 | Flaherty | 313/486 X |
| 4,829,188 | 5/1989 | Shinomiya et al. | 250/301.4 H X |

Primary Examiner—Donald J. Yusko
Assistant Examiner—Ashok Patel
Attorney, Agent, or Firm—Edward M. Corcoran; Stanley C. Corwin

[57] ABSTRACT

Yttrium-containing phosphors can be stabilized for use in an aqueous slurry containing a binder, which slurry can be used for coating fluorescent lamps by treating with ammonium dihydrogen phosphate and ammonium hydrogen difluoride to inactivate free yttrium ions. The resulting aqueous slurry is stable and provides coated fluorescent lamps having uniform coatings that are bright and long lasting.

5 Claims, 1 Drawing Sheet

FLUORINE F 1s XPS SPECTRUM

FLUORESCENT LAMPS AND IMPROVED YTTRIUM-CONTAINING PHOSPHORS USEFUL THEREIN

CROSS-REFERENCE TO RELATED APPLICATION

The present application is a divisional application under 37 CFR 1.60 of application Ser. No. 07/908,598, filed on Jun. 30, 1992, now U.S. Pat. No. 5,268,614, which, in turn, is a continuation application under 37 CFR 1.62 of now-abandoned parent application Ser. No. 07/656,655, filed on Feb. 19, 1991.

FLUORESCENT LAMPS AND IMPROVED YTTRIUM-CONTAINING PHOSPHORS USEFUL THEREIN

This invention relates to improved fluorescent lamps and to improved yttrium-containing phosphors used for making them. More particularly, this invention relates to fluorescent lamps coated with yttrium-containing phosphors of improved stability.

BACKGROUND OF THE INVENTION

Fluorescent lamps comprise an elongated tubular envelope having a pair of electrodes sealed into each end thereof. The interior surface of the envelope is coated with a finely divided fluorescent material, and the envelope is filled with a gaseous atmosphere, such as of a rare gas and a metal vapor. In operation, the electrodes create an electrical discharge which in turn emits ultraviolet radiation that excites the fluorescent material, causing it to glow.

Such fluorescent lamps are made by suspending suitable phosphor particles and a suitable binder in a solvent, flushing the interior surface of the lamp envelope with the resultant suspension, draining off the excess suspension, and heating the interior wall of the envelope to remove the solvent and organic materials. An adherent coating of the phosphor material now covers the interior walls of the lamp envelope.

Yttrium-containing phosphors can be used alone, or along with other phosphors, as is known. For example, triphosphor-coated fluorescent lamps have the advantage of well-resolved spectral lines, which provide better lighting to the human eye than standard cool-white halophosphate lamps, which have a broad spectral emission. In these lamps, the three phosphors applied to lamps are a red phosphor, generally yttrium europium oxide ($Y_2O_3$:Eu), a green phosphor, usually either CAT [(Ce,Tb)$MgAl_{11}O_{19}$] or lanthanum phosphate (La-$PO_4$:Tb,Ce), and a blue phosphor, either BAM (BaMg$_2Al_{27}$:Eu) or strontium phosphate ($Sr_5(PO_4)_3Cl$:Eu). The relative amounts of the red, green and blue phosphor are adjusted to achieve the desired lamp operating temperature (color point).

Although we have illustrated the use of yttrium europium oxide phosphors in one particular family of lamps, the phosphor of the invention can be used equally in other lamp types, such as a two-component single coat phosphor blend of the narrow band yttrium oxide:Eu phosphor with a broad band strontium yellow or strontium green phosphor. Furthermore, the narrow band red, green and blue phosphors may be applied as a second coat over a layer of the broad band white halophosphor, or as a thicker, single coat of phosphor.

Yttrium-containing phosphors and mixtures of phosphors can be applied from a non-aqueous slurry, for example based on a nitrocellulose binder, in organic solvents such as butyl acetate, which provides stable phosphor slurries. However, the use of organic solvents is expensive, creates fire hazards and is subject to strict environmental regulation as well, and it would be highly desirable to substitute aqueous slurries in place of the organic solvent slurries. However, aqueous phosphor slurries that contain yttrium-containing phosphors sometimes prove unstable; they can exhibit poor chemical stability and poor coating appearance. Particularly in the presence of polymeric binders that contain reactive chemical groups, such as hydroxyl and carboxyl groups, e.g., polyacrylic acid, the slurries form a nonpourable gel within a few days. These gels cannot be reconstituted, and thus the phosphor must be reclaimed laboriously. When these aqueous phosphor/binder compositions are used as coatings in fluorescent lamps, severe flocculation of the phosphor can also occur, resulting in objectionable appearance defects in the coated lamps.

Further, the instability and gelation time varies from batch to batch of the phosphor, creating uncertainty in the behavior and stability of each batch of phosphor, which cannot be tolerated in a modern manufacturing facility.

Thus improved yttrium-containing phosphors and mixtures thereof in aqueous slurries having improved stability and resistance to gelation and flocculation, a method of obtaining the same, and of producing fluorescent lamps using the improved slurries, would be highly desirable.

SUMMARY OF THE INVENTION

We have found that yttrium-containing phosphors can be surface treated to render them stable in aqueous slurries. An yttrium-containing phosphor is coated with a mixture of ammonium hydrogen difluoride and ammonium dihydrogen phosphate. The resultant phosphors, when added to water containing a suitable binder, form slurries that are stable to gelation and flocculation and can be employed to coat long lasting, bright fluorescent lamp bulbs uniformly. The dependability of the present phosphor slurries decreases lamp manufacturing costs with no degradation of lamp brightness or maintenance.

DETAILED DESCRIPTION OF THE INVENTION

Figure 1:
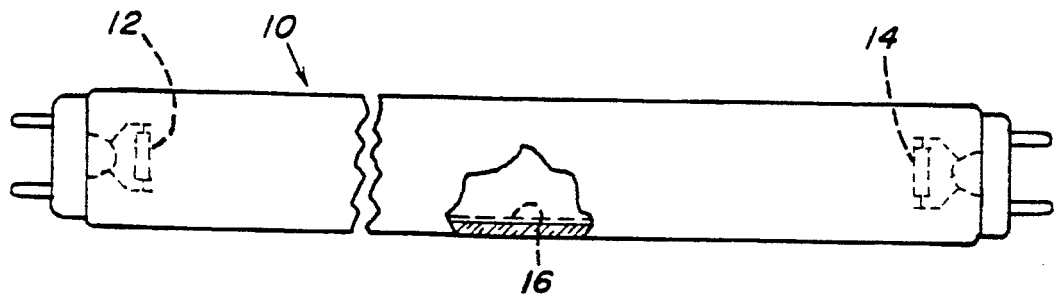
FIG. 1 is a side view, partially broken away, of a fluorescent lamp of the present invention.

The improved fluoresecent lamps of the invention are described with reference to FIG. 1. A tubular envelope 10, usually made of glass, has a pair of electrodes 12 and 14 disposed within the envelope 10 and spaced apart therein. The interior surface of the envelope 10 is coated with a layer 16 of phosphors including the treated yttrium-containing phosphor of the invention.

During manufacture of the lamp, the envelope 10 is flushed with a slurry of the yttrium-containing phosphor 16 of the invention, any excess phosphor slurry is drained off while water is removed in the drying process. finally the envelope is fired to remove any remaining organic species, including the binder. The electrodes 12 and 14 are put in place, the envelope is filled with an inert gas and a vaporizable metal such as mercury, and sealed.

Also according to the present invention, yttrium-containing phosphors are treated with ammonium hydrogen difluoride and ammonium dihydrogen phosphate. A chemical reaction occurs between the difluoride and the phosphate and the phosphor surface which provides a passive and insoluble surface layer of a mixture of compounds, including yttrium phosphate, yttrium trifluoride, yttrium oxyfluoride and other compounds of yttrium, phosphorus, oxygen and hydrogen.

Although the exact mechanism of the gelation is not understood, it is believed that yttrium ions leach out of the phosphor in an aqueous slurry and decrease the surface charge of the phosphor. The released cations of the phosphor react with reactive groups on the binder, causing the formation of a gelled shell of the binder around the particles. This effect intensifies with time, and thus the coagulation or gelation increases until the slurry is rendered unusable. It is believed that it is the yttrium ion concentration and pH that lead to rapid gelation of the slurry. If the yttrium ion concentration is over about 1500 ppm at a pH of 8.5 of more, gelation of the polyacrylic acid/yttrium-containing phosphor slurry occurs rapidly.

Also, it is believed that the treatment of the surface of the yttrium-containing phosphor in accordance with the present invention passivates the surface of the phosphor by preventing the formation of free yttrium ions that can react with the polyacrylic acid binder. It is believed that the passivated yttrium-containing phosphor has very low solubility in the presence of polymethacrylic acid, hence the amount of yttrium ion released is very small.

The treated phosphor of the invention is made by separately preparing aqueous solutions of ammonium hydrogen difluoride and ammonium dihydrogen phosphate and adding them slowly in alternating fashion to a fine dispersion of the yttrium-containing phosphor particles in water. The pH of the resultant slurry is adjusted to 9.0 or over with ammonium hydroxide. The resultant surface-treated phosphor of the invention is separated, washed multiple times with deionized water, the pH of which has been increased to a pH of about 9 with ammonium hydroxide, and dried.

Treatment of an yttrium-containing phosphor with ammonium dihydrogen phosphate results in a reduction of the reactivity of the phosphor with slurry ingredients that contain acidic groups such as hydroxyl and carboxyl.

Treatment of an yttrium-containing phosphor with ammonium fluoride also serves to increase the acidity of the phosphor, and results in strong oxyfluoride and fluoride bonding. The resultant phosphor has a surface abundance of fluoride functionalities. The double treatment of the phosphor with the fluoride and phosphate is synergistic and essential to the success of the treatment, i.e., either of the reagents alone is insufficient to achieve the desired results.

The amount and strength of the passivating reagents must be carefully controlled so that after washing the phosphor, residual free phosphate ions are removed. Residual free phosphate ions are known to be detrimental to the life and performance of fluorescent lamps.

The slurry formulation useful in coating fluorescent lamps can vary widely, as is known, and includes, in addition to the phosphors, a binder, surface active agents, dispersants and thickeners, as is known to one skilled in the art. These materials adsorb on the surface of the phosphors and produce changes in the surface chemistry which affect the properties of the slurry used to coat fluorescent lamps and the final performance of the lamp.

Suitable binders include polyacrylic acid, which contains surface active group such as hydroxyl and carboxyl groups, and polyethylene oxide. Suitable dispersants include an acrylate ammonium salt having a molecular weight of about 20,000, commercially available as Dispex from Allied Colloids, Inc. This dispersant also contains carboxyl functional groups which impart a negative charge to solid surfaces and increase the negative surface potential of the phosphor slurries. Even a small amount of Dispex can alter the surface chemistry of an untreated yttrium-containing phosphor, and in general reverses the sign of the charge on the phosphor particles from positive to negative, and shifts the surface chemistry toward the acidic side, i.e., reacts with basic groups. Thus the treated phosphors of the present invention, wherein active surface groups have been inactivated, do not vary in charge, and the resultant slurries are more stable.

The phosphor slurries useful for coating the interior surface of fluorescent lamp envelopes are made by adding the treated phosphor of the invention and from about 0.5 to 1.5% by weight of the phosphor of a polymethacrylic acid binder, and optionally other ingredients standard in the industry, to water. The slurries of the invention are stable and do not gel or flocculate on standing, even for several months.

The aqueous phosphor slurries of the invention have no free phosphate ions that can be detrimental to phosphor lumens or to the maintenance of fluorescent lamps.

The invention will be further illustrated by the following examples, but it is to be understood that the invention is not meant to be limited to the details described therein.

EXAMPLE 1

One hundred grams of yttrium-europium oxide phosphor (GE-XL-688-CY of General Electric Company) and 100 ml of distilled water were stirred together in a plastic beaker and dispersed by sonication. Ten ml of 1.0% by weight aqueous ammonium hydrogen difluoride solution and 40 ml of distilled water were separately mixed. A third solution was similarly prepared with ammonium dihydrogen phosphate.

The solutions were combined while stirring briskly by adding a few drops of the ammonium hydrogen difluoride solution alternately with the phosphate solution to the phosphor. The rate of addition was gradually increased until about one-half of the solutions were added to the phosphor, when the remaining portions were added together while stirring continuously.

Dilute ammonium hydroxide solution was added to the phosphor slurry until pH test paper showed a pH of over 9. Stirring was continued at moderate speed for one-half hour longer.

The resultant slurry was centrifuged and the solids collected and washed four times with 150 ml portions of distilled water to which ammonium hydroxide had been added to a pH of 9.

The phosphor solids were dried in a 90° C. oven for three hours, the phosphor cake was broken up and the phosphor dried at 115° C. for one-half hour. The phosphor was cooled to room temperature, and the soft agglomerates broken up with a spatula. The coated phosphor was stored in a closed container.

Figure 2:
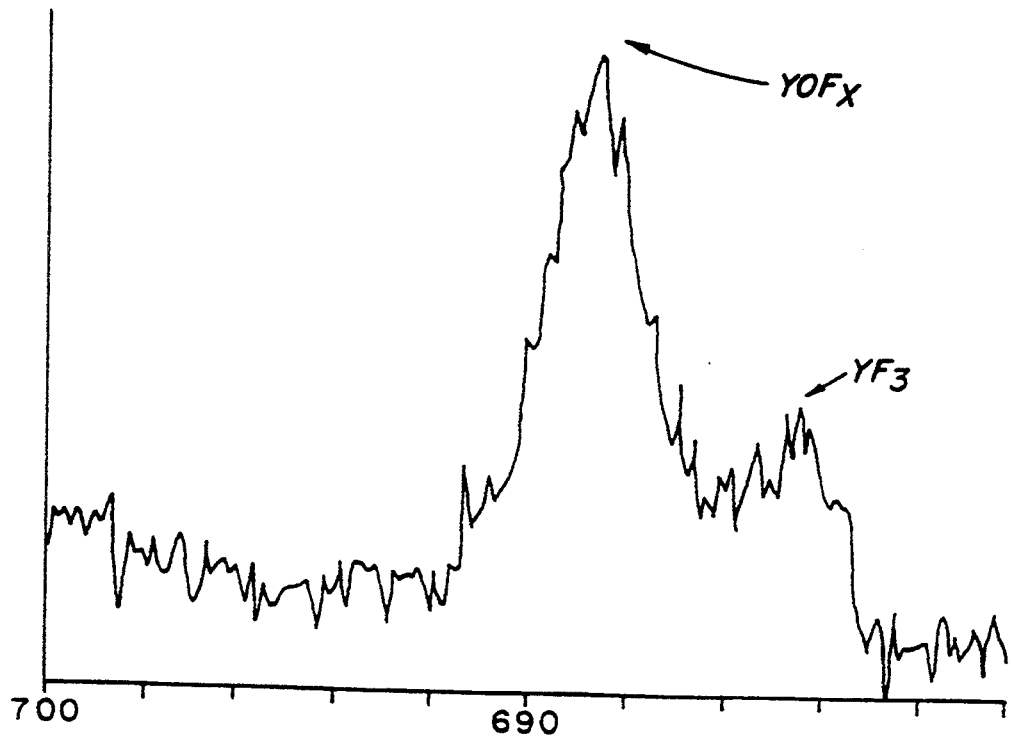
FIG. 2 is an X-ray photoelectron spectroscopy spectrum of a coated phosphor of the invention.

FIG. 2 is an x-ray photoelectron spectroscopy spectrum of the phosphor product prepared as above. The spectrum shows a $YOF_x$ peak at about 690 ev and a $YF_3$ peak at about 685 ev.

Elemental analysis of the above treated phosphor and an untreated yttrium-europium oxide phosphor control was performed by X-ray photoelectron spectroscopy. The results are given below in Table I.

TABLE I

| Sample | Concentration, atomic percent | | | | | |
|---|---|---|---|---|---|---|
| | Y | O | C | F | P | OH |
| Example 1 | 13 | 35 | 46 | 3.0 | 1.5 | 26 |
| Control | 19 | 48 | 33 | 0.0 | 0.0 | 30 |

The results show that the treated phosphors of the invention contain fluoride and phosphorus compounds, unlike the untreated control.

The washed and dried phosphor was tested for soluble phosphate by the vanadate/molybdate/stannous colorimetric method. No soluble phosphate ions were found.

EXAMPLE 2

The stability of an untreated phosphor control and a treated phosphor as prepared in Example 1 was compared. A 1% by weight polymethacrylic acid polymer solution was added to each of several samples of 12.5% by weight of phosphor suspended in water to produce a concentration of 1 gram of polymer per 100 grams of phosphor. The slurries were allowed to stand at room temperature and the pH was measured after 22 days. The results obtained are summarized below in Table II.

TABLE II

| Sample | Age When Gelled | pH After 22 Days |
|---|---|---|
| Example | not gelled after 56 days | 10.4 |
| Control | 3–8 days | 11.3 |

EXAMPLE III

Several runs of treated and untreated yttrium-europium oxide phosphor-polyacrylic acid slurries were made using for the treated phosphor an yttrium-europium oxide phosphor known to be particularly susceptible to rapid gelation. The phosphor of Run 3 was made from a phosphor less susceptible to gelation.

F40T12 bulbs were coated at 4.5–5.5 grams/bulb using both phosphors treated according to Example 1 or untreated phosphors as a control. Lamps were manufactured from the bulbs using standard F40T12 Mainlighter$^R$ lamp manufacturing conditions. The lamps were tested for lumen output and maintenance in accordance with standard lamp photometry procedures. The results are given below in Table III.

TABLE III

| Sample | 100 Hour Lumens | 1000 Hours Maintenance | % |
|---|---|---|---|
| Run I, coated | 2615+/−29 | 97.3+/−0.9 | 99 |
| Run I, control | 2638+/−34 | 96.7+/−0.6 | |
| Run II, coated | 2622+/−29 | 97.8+/−1.0 | 100 |
| Run II, coated | 2602+/−19 | 97.9+/−0.6 | 99 |
| Run II, control | 2625+/−12 | 96.8+/−2.4 | |
| Run III, coated | 2688+/−13 | 97.0+/−0.4 | 99 |
| Run III, control | 2724+/−10 | 96.8+/−0.5 | |

It is apparent that no appreciable degradation, in lumens or maintenance, of the bulbs coated with the treated phosphor of the invention was found.

As is known to those skilled in the art, various modifications and substitutions may be made to the phosphors and processes of the invention without departing from the essence of the invention, and are meant to be included herein. The invention is only to be limited by the scope of the appended claims.

We claim:

1. In a fluorescent lamp comprising an envelope containing two electrodes at each end thereof, a phosphor coating on the interior surface of the envelope and an inert vapor containing a vaporizable metal sealed therein, the improvement which comprises utilizing as the phosphor coating on the interior surface of the envelope yttrium-containing phosphor particles each including a surface containing phosphorus compounds of yttrium and fluoride compounds of yttrium on the surface.

2. A lamp according to claim 1 wherein the phosphor is an yttrium oxide phosphor activated with europium.

3. A lamp according to claim 1 wherein the phosphor is an admixture of green, blue and yttrium-containing phosphors.

4. An yttrium-containing phosphor comprising yttrium-containing phosphor particles each including a surface containing phosphorus compounds of yttrium and fluorine compounds of yttrium on the surface.

5. A phosphor according to claim 4 wherein the phosphor is yttrium oxide phosphor activated with europium.

* * * * *